United States Patent
Sawa et al.

(10) Patent No.: US 6,351,397 B1
(45) Date of Patent: Feb. 26, 2002

(54) PROTECTION APPARATUS AND PROTECTION METHOD OF PWM CYCLOCONVERTER

(75) Inventors: Toshihiro Sawa; Xiaorong Xia; Sadao Ishii; Eiji Yamamoto; Hidenori Hara, all of Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/830,700

(22) PCT Filed: Oct. 28, 1999

(86) PCT No.: PCT/JP99/06010

§ 371 Date: Apr. 30, 2001

§ 102(e) Date: Apr. 30, 2001

(87) PCT Pub. No.: WO00/27019

PCT Pub. Date: May 11, 2000

(30) Foreign Application Priority Data

Oct. 30, 1998 (JP) .......................................... 10-310843

(51) Int. Cl.[7] ................................................ H02H 7/10
(52) U.S. Cl. ......................... 363/50; 363/159; 323/207
(58) Field of Search ............................... 363/34, 50, 52, 363/54, 56.03, 56.04, 56.05, 157, 159; 323/205, 207

(56) References Cited

U.S. PATENT DOCUMENTS

| | | | | |
|---|---|---|---|---|
| 4,760,321 A | * | 7/1988 | Tamaka et al. | 318/809 |
| 4,843,296 A | * | 6/1989 | Tanaka | 318/800 |
| 5,005,115 A | | 4/1991 | Schauder | 363/159 |
| 5,047,909 A | * | 9/1991 | Hosoda | 363/40 |
| 5,483,140 A | * | 1/1996 | Hess et al. | 318/802 |
| 5,504,667 A | * | 4/1996 | Tanaka et al. | 363/37 |
| 5,969,966 A | * | 10/1999 | Sawa et al. | 363/163 |
| 6,278,622 B1 | * | 8/2001 | Shimazaki et al. | 363/37 |

FOREIGN PATENT DOCUMENTS

| | | | | |
|---|---|---|---|---|
| JP | 51-140124 | 2/1976 | .......... | H02P/13/30 |
| JP | 60-174065 | 9/1985 | ............ | H02M/5/27 |

OTHER PUBLICATIONS

Abstract 51–140124, Feb. 12, 1976.
Abstract 60–174065, Sep. 7, 1985.

* cited by examiner

*Primary Examiner*—Adolf Deneke Berhane
(74) *Attorney, Agent, or Firm*—Sughrue Mion, PLLC (57) ABSTRACT

A protection apparatus and a protection method of a PWM cycloconverter wherein when the PWM cycloconverter is shut off, a surge voltage or an overcurrent is not produced on the output side are provided. A protection apparatus of a PWM cycloconverter is made up of fault detection means 30 for detecting a fault of the PWM cycloconverter, operation stop means 25 for turning off at least some of the unidirectional semiconductor switches 3 to 20 of the PWM cycloconverter if a fault signal occurs, continuous flow means for allowing a load current of the PWM cycloconverter to continuously flow if at least some output phases of the PWM cycloconverter become open, and protection switching means 50 for turning on and off the unidirectional semiconductor switches of the PWM cycloconverter based on the fault signal output from the fault detection means.

6 Claims, 8 Drawing Sheets

PROTECTION APPARATUS AND PROTECTION METHOD OF PWM CYCLOCONVERTER

TECHNICAL FIELD

This invention relates to a protection apparatus and a protection method of a PWM cycloconverter for converting an AC voltage into an arbitrary AC voltage or DC voltage.

BACKGROUND ART

Figure 8:
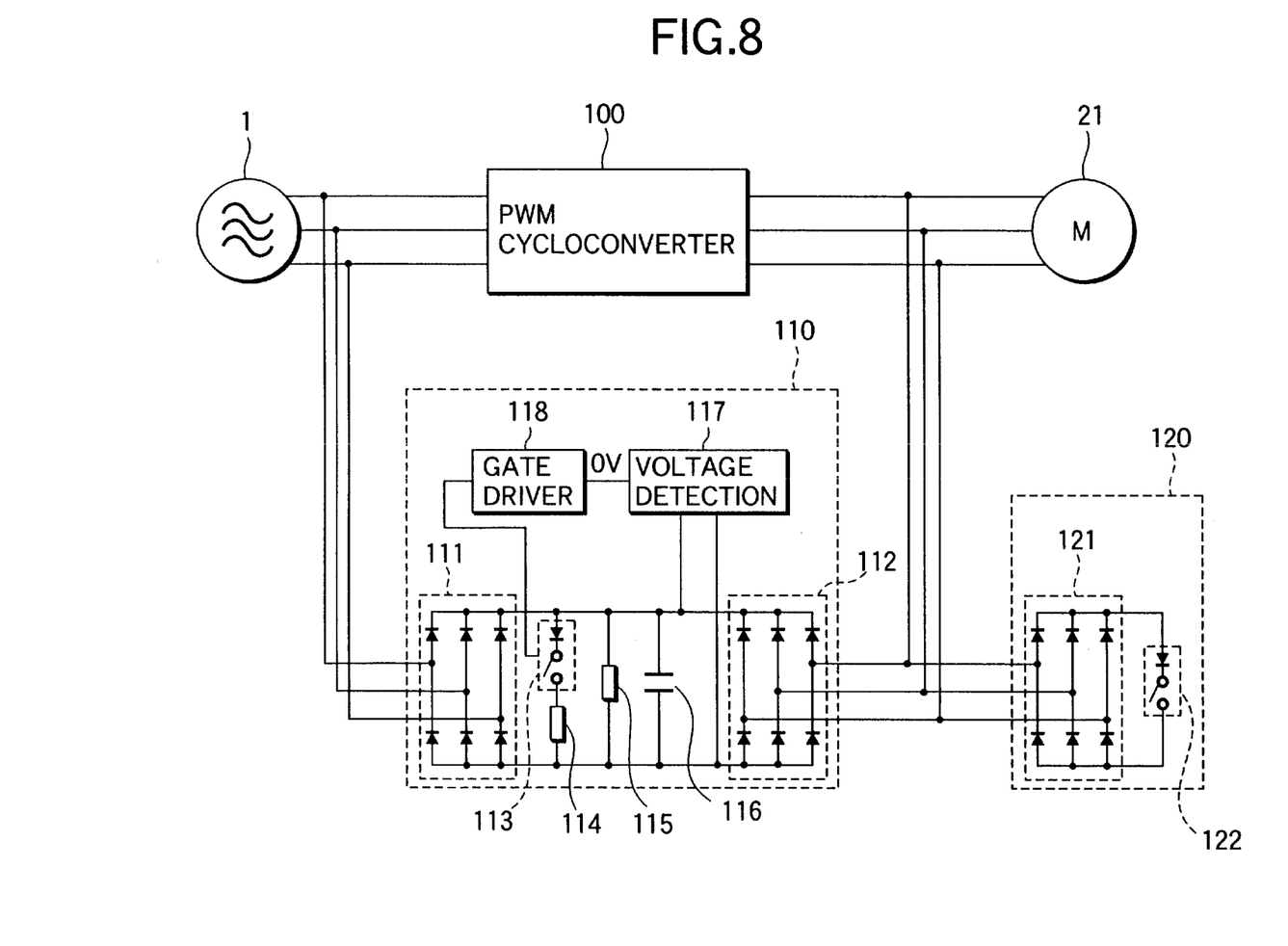
FIG. 8 is a diagram of a protection circuit of a three-phase/three-phase PWM cycloconverter in a related art.

FIG. 8 shows a protection circuit for suppressing a surge voltage of the output side of a PWM cycloconverter in a related art. In FIG. 8, numeral 1 denotes a three-phase AC power supply, numeral 100 denotes a normal PWM cycloconverter, numeral 21 denotes a three-phase AC motor, numeral 110 denotes a rectification snubber circuit, numeral 120 denotes an output short circuit, numerals 111, 112, and 121 denote three-phase rectification bridges, numerals 113 and 122 denote uni-directional semiconductor switches, 114 and 115 denote resistors, numeral 116 denotes a capacitor, numeral 117 denotes a voltage detection circuit, and numeral 118 denotes a gate driver. In the PWM cycloconverter, the output and input sides are connected directly by bi-directional semiconductor switches for allowing a current to flow in bi-directionals and thus if two or more of three bi-directional switches connected in the same output phase are turned on at the same time at the commutating time, the input side becomes short-circuited and if the three bi-directional switches are turned off at the same time, the output side becomes open. As means for preventing the phenomenon, the load current direction is detected and the information can be used to commutate without opening the output side and without short-circuiting the input side. However, if the load current direction is erroneously detected during commutating (easy to be erroneously detected particularly in the vicinity of zero of load current), there is a possibility that the output side may be opened. When an overcurrent or an overvoltage on the input side or the load side, overheating of a motor winding or a semiconductor device of the main circuit, or the like (simply, operation anomaly) occurs, it is necessary to shut off the current of the PWM cycloconverter, namely, stop the operation abruptly. If all three bi-directional switches are turned off at the same time, the output side becomes open. To drive an induction motor, if the output side of the PWM cycloconverter becomes open during the operation, a large surge voltage occurs on the output side of the PWM cycloconverter.

When the output side of the PWM cycloconverter becomes open because of a commutation mistake during the normal operation, the load current continues to flow into the capacitor 116 via the three-phase rectification bridge 112, and a large surge voltage does not occur. The voltage detection circuit 117 detects the voltage level of the capacitor 116 and when the voltage of the capacitor 116 becomes a certain degree or more, the voltage detection circuit 117 outputs an overvoltage signal OV. The uni-directional switch 113 is turned on by the overvoltage signal OV and the capacitor 116 is discharged. When an operation anomaly occurs, first all uni-directional switches of the PWM cycloconverter are turned off. After a given time interval (Δt) from the time, the uni-directional switch 122 is turned on. Δt should be longer than the on or off time of the semiconductor switch. The load current continues to flow into the capacitor 116 via the three-phase rectification bridge 112 during Δt and the uni-directional switch 122 is turned on and thus the load current continues to flow via the three-phase rectification bridge 121 and the uni-directional switch 122 and reduces to zero.

However, in the protection method of the PWM cycloconverter in the related art, if the uni-directional switch 122 is turned on during the operation and three phases of output are short-circuited for a long period of time (for example, until the end of shut off), an excessive motor stator current flows and there is a possibility that the facilities may be destroyed.

Next, the function of rectification snubber is to absorb a surge voltage occurring in the period of time in which the output side becomes open. The output side becomes open in either of the following two cases: One case where the load current direction is erroneously detected at the commutating time and the other case being the time interval Δt until all uni-directional switches are turned off and the uni-directional switch 122 is turned on at the shut off time. In both cases, the period of time in which the output side becomes open is almost the same; however, as compared with the fact that a detection mistake of the load current direction occurs only in the vicinity of zero of the load current, shut off caused by a fault, etc., often occurs when the current is rated current or overcurrent. Therefore, the surge voltage in the latter case is larger by far than that in the former case and as its countermeasure, the capacitor capacitance of the rectification snubber is large; this is also a problem. Further, normally the surge voltage produced by a commutation mistake is absorbed by the capacitor 116 of the rectification snubber and electric power accumulated in the capacitor 116 of the rectification snubber cannot be regenerated; this is also a problem.

DISCLOSURE OF INVENTION

It is therefore an object of the invention to provide a protection apparatus and a protection method of a PWM cycloconverter wherein when the PWM cycloconverter is shut off, a surge voltage is not produced on the output side, an overcurrent of a motor stator is not produced, an output short circuit is not required, and moreover a rectification snubber circuit does not exist or the capacitance of a capacitor of rectification snubber can be lessened exceptionally.

To solve the above-mentioned problems, according to the invention, there is provided a protection apparatus of a PWM cycloconverter of a power converter wherein phases of a three-phase AC power supply and phases of the power converter for outputting M phases (where M is an integer of two or more) are directly connected by bi-directional semiconductor switches each consisting of a pair of uni-directional semiconductor switches for allowing an electric current to flow only in uni-directional and being able to be turned on and off separately, the protection apparatus comprising:

fault detection means for detecting a fault of the above-mentioned PWM cycloconverter;

operation stop means for turning off at least some of the above-mentioned uni-directional semiconductor switches of the above-mentioned PWM cycloconverter if the above-mentioned fault signal occurs;

continuous flow means for allowing a load current of the above-mentioned PWM cycloconverter to continuously flow if at least some output phases of the above-mentioned PWM cycloconverter become open; and protection switching means for turning on and off the above-mentioned uni-directional semiconductor switches of the above-mentioned PWM cycloconverter based on the fault signal output from the above-mentioned fault detection means, thereby allowing the above-mentioned load current to continuously flow into the above-mentioned three-phase AC power supply via the above-mentioned PWM cycloconverter.

In the invention, the above-mentioned protection switching means comprises:

input voltage information detection means for recognizing voltages of three terminals of the input side of the above-mentioned bi-directional semiconductor switches as three-phase input voltages and detecting information based on which greater-than, equal-to, less than relation of the above-mentioned three-phase input voltages can be determined as input voltage information and regenerative switching means for turning on only the above-mentioned uni-directional semiconductor switch from each output phase to an input phase which becomes the maximum voltage of the above-mentioned three-phase input voltages or only the above-mentioned uni-directional semiconductor switch from an input phase which becomes the minimum voltage of the above-mentioned three-phase input voltages to each output phase based on the input voltage information.

In the invention, the above-mentioned protection switching means comprises the above-mentioned input voltage information detection means and the above-mentioned regenerative switching means;

short-circuit switching means for turning on at least some of the above-mentioned unidirectional semiconductor switches between one arbitrary phase of the above-mentioned three-phase AC power supply and each output phase; and switch means for switching the above-mentioned regenerative switching means and the above-mentioned short-circuit switching means for use.

In the invention, the protection apparatus of the PWM cycloconverter comprises:

input voltage information detection means for recognizing voltages of three terminals of the input side of the above-mentioned bi-directional semiconductor switches as three-phase input voltages and detecting information based on which greater-than, equal-to, less than relation of the above-mentioned three-phase input voltages can be determined as input voltage information and gate drive means for always turning on the above-mentioned uni-directional semiconductor switch from each output phase to an input phase which becomes the maximum voltage of the above-mentioned three-phase input voltages and the above-mentioned uni-directional semiconductor switch from an input phase which becomes the minimum voltage of the above-mentioned three-phase input voltages to each output phase based on the input voltage information while the above-mentioned PWM cycloconverter is operating or is shut off.

According to the invention, there is provided a protection method of a PWM cycloconverter of a power converter wherein phases of a three-phase AC power supply and phases of the power converter for outputting M phases (where M is an integer of two or more) are directly connected by bi-directional semiconductor switches each consisting of a pair of unidirectional semiconductor switches for allowing an electric current to flow only in uni-directional and being able to be turned on and off separately, the protection method comprising the steps of detecting a fault of the above-mentioned PWM cycloconverter;

turning off at least some of the above-mentioned uni-directional semiconductor switches of the above-mentioned PWM cycloconverter if the above-mentioned fault signal occurs;

allowing a load current of the above-mentioned PWM cycloconverter to continuously flow if at least some output phases of the above-mentioned PWM cycloconverter become open; and turning on and off the above-mentioned uni-directional semiconductor switches of the above-mentioned PWM cycloconverter based on the fault signal output from the above-mentioned fault detection means, thereby allowing the above-mentioned load current to continuously flow into the above-mentioned three-phase AC power supply via the above-mentioned PWM cycloconverter.

In the invention, voltages of three terminals of the input side of the above-mentioned bi-directional semiconductor switches are recognized as three-phase input voltages and information based on which greater-than, equal-to, less than relation of the above-mentioned three-phase input voltages can be determined is detected as input voltage information and only the above-mentioned uni-directional semiconductor switch from each output phase to an input phase which becomes the maximum voltage of the above-mentioned three-phase input voltages or only the above-mentioned uni-directional semiconductor switch from an input phase which becomes the minimum voltage of the above-mentioned three-phase input voltages to each output phase is turned on based on the input voltage information.

In the invention, regenerative switching means for turning on only the above-mentioned uni-directional semiconductor switch from each output phase to an input phase which becomes the maximum voltage of the above-mentioned three-phase input voltages or only the above-mentioned unidirectional semiconductor switch from an input phase which becomes the minimum voltage of the above-mentioned three-phase input voltages to each output phase based on the input voltage information and short-circuit switching means for turning on at least some of the above-mentioned uni-directional semiconductor switches between one arbitrary phase of the above-mentioned three-phase AC power supply and each output phase are switched.

In the invention, in the protection method of the PWM cycloconverter, voltages of three terminals of the input side of the above-mentioned bi-directional semiconductor switches are recognized as three-phase input voltages and information based on which greater-than, equal-to, less than relation of the above-mentioned three-phase input voltages can be determined is detected as input voltage information and the above-mentioned uni-directional semiconductor switch from each output phase to an input phase which becomes the maximum voltage of the above-mentioned three-phase input voltages and the above-mentioned uni-directional semiconductor switch from an input phase which becomes the minimum voltage of the above-mentioned three-phase input voltages to each output phase are always turned on based on the input voltage information while the above-mentioned PWM cycloconverter is operating or is shut off.

As described above, to protect the PWM cycloconverter, according to the invention, the following advantages are provided: The output short circuit 120 is not required, the capacitor of the rectification snubber can be lessened, and when the PWM cycloconverter is shut off, a surge voltage does not appear on the output side and the motor current is not increased. The advantages that the rectification snubber circuit is not required and that the power loss caused by a commutation mistake is small are also provided.

BEST MODE FOR CARRYING OUT THE INVENTION

Figure 1:
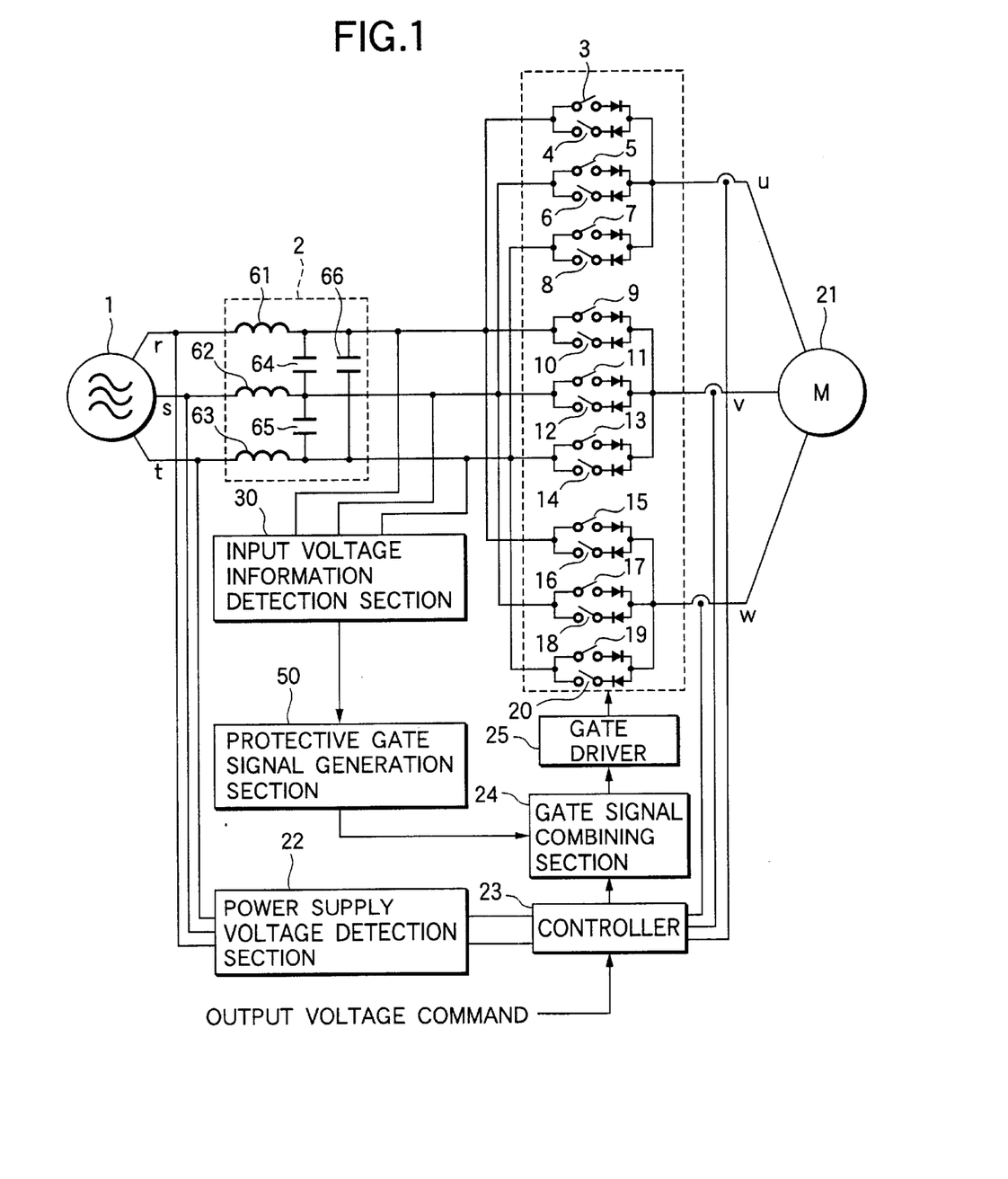
FIG. 1 is a block diagram of a three-phase/three-phase PWM cycloconverter of a first embodiment of the invention.

Embodiments of the invention will be discussed with reference to the accompanying drawings. FIG. 1 is a block diagram to show the configuration of a PWM cycloconverter of a first embodiment of the invention (in the first embodiment, the number of phases M=3). In FIG. 1, numeral 1 denotes a three-phase AC power supply, numeral 2 denotes an AC line filter, numerals 61, 62, and 63 denote reactors, numerals 64, 65, and 66 denote capacitors, numerals 3, 4, 5, 6, 7, 8, 9, 10, 11, 12, 13, 14, 15, 16, 17, 18, 19, and 20 denote uni-directional semiconductor switches (simply, uni-directional switches) for allowing an electric current to flow only in uni-directional and having a self-arc-extinguishing capability, which are represented respectively as Sru, Sur, Ssu, Sus, Stu, Sut, Srv, Svr, Ssv, Svs, Stv, Svt, Srw, Swr, Ssw, Sws, Stw, and Swt. The uni-directional switches are IGBT, MOS-FET, etc., for example. Sxy denotes a uni-directional switch from input x phase to output y phase and Syx denotes a uni-directional switch from output y phase to input x phase (x=r, s, t; y=u, v, w). Numeral 21 denotes a three-phase AC motor, numeral 22 denotes a power supply voltage detection circuit, numeral 23 denotes a controller, numeral 24 denotes a gate signal combining section, numeral 25 denotes a gate driver, and numeral 30 denotes an input voltage information detection section. This input voltage information detection section 30 inputs voltages of three terminals of the input side of each uni-directional switch (simply, input voltages) and prepares and outputs information concerning the greater-than, equal-to, less-than relation of the three-phase input voltages (simply, input voltage information). Numeral 50 denotes a protective gate signal generation section.

The power supply voltage detection circuit 22 in FIG. 1 inputs the power supply voltage and outputs the phase of the power supply voltage and an instantaneous value of the power supply voltage. The controller 23 generates and outputs gate signals G1$xy$, G1$yx$ (x=r, s, t; y=u, v, w) (simply, G1) of the 18 uni-directional switches from an output voltage command, the phase of the power supply voltage, the instantaneous value of the power supply voltage, and the load current direction. In the first embodiment, to turn on Sxy, G1$xy$ is set to 1, to turn off Sxy, G1$xy$ is set to 0, to turn on Syx, G1$yx$ is set to 1, and to turn off Syx, G1$yx$ is set to 0 (x=r, s, t; y=u, v, w).

Figure 2:
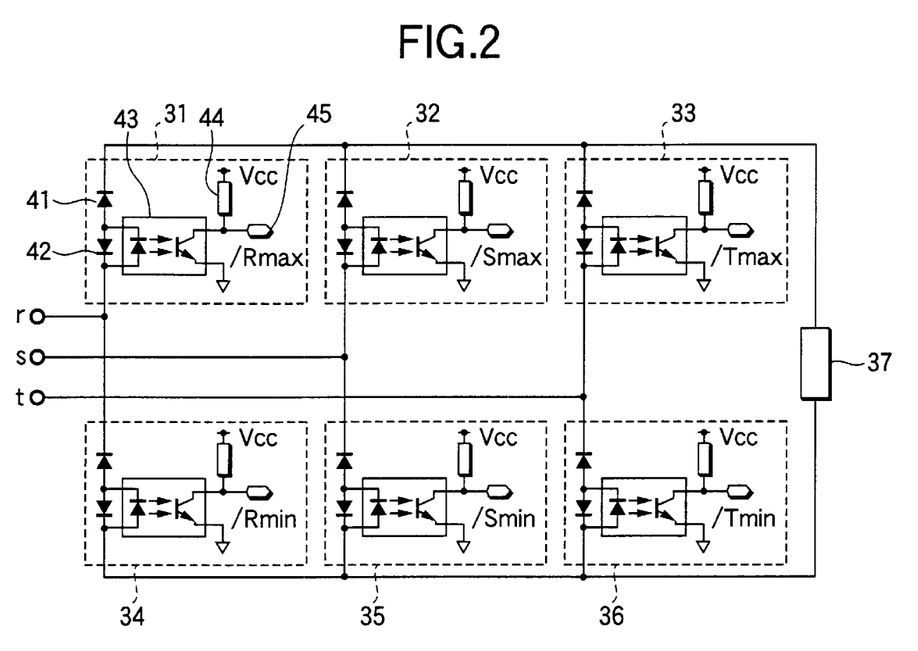
FIG. 2 is a circuit diagram of an input voltage information detection section of the invention.

FIG. 2 is a diagram of the configuration of the input voltage information detection section 30. In FIG. 2, numerals 31, 32, 33, 34, 35, and 36 denote current detection circuits having the same configuration. In FIG. 2, numeral 37 denotes a resistor. The current detection circuit 31 is taken as an example to describe the current detection circuit. Numerals 41 and 42 denote diodes, numeral 43 denotes a photocoupler, numeral 44 denotes a resistor, numeral 45 denotes an output terminal, and Vcc denotes a positive pole of DC power supply. When a current flows into the diode 41, the voltage of the output terminal 45 goes low. When no current flows into the diode 41, the voltage of the output terminal 45 is high. For example, when the voltage of the r phase is the maximum, /Rmax is set to 0; when the voltage is the minimum, /Rmin is set to 0. This also applies to the s and t phases.

Figure 3:
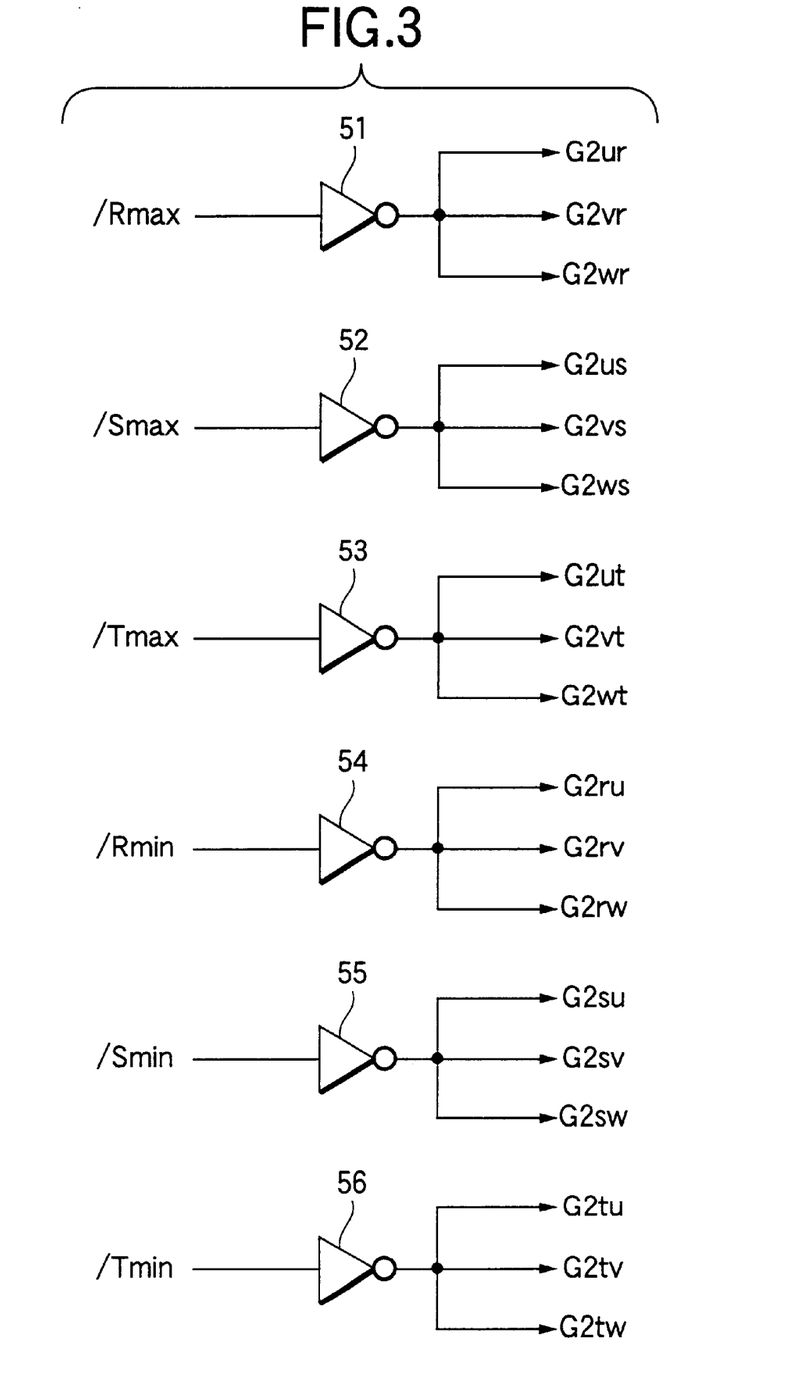
FIG. 3 is a circuit diagram of a protective gate signal generation section of the invention.

The protective gate signal generation section 50 in FIG. 1 generates and outputs gate signals G2$xy$, G2$yx$ (x=r, s, t; y=u, v, w) (simply, G2) based on the input voltage information from the input voltage information detection section 30, for example. FIG. 3 is a diagram of the configuration of the protective gate signal generation section 50. Numerals 51, 52, 53, 54, 55, and 56 denote inverters. When G2$xy$ is 1, Sxy is turned on; when G2$yx$ is 1, Syx is turned on (x=r, s, t; y=u, v, w).

Uni-directional switch (represented as Syp) from output y phase to an input phase which becomes the maximum voltage of the three-phase input voltages (simply, input maximum voltage phase) is turned on (y=u, v, w) by G2$yx$ (x=r, s, t).

Uni-directional switch (represented as Sny) from an input phase which becomes the minimum voltage of the three-phase input voltages (simply, input minimum voltage phase) to output y phase is turned on (y=u, v, w) by G2$xy$ (x=r, s, t).

Any input phase other than the input maximum voltage phase or the input minimum voltage phase in the three phases of input is represented as input intermediate voltage phase.

The gate signal combining section 24 in FIG. 1 outputs the result of ORing G1$xy$, G1$yx$ and G2$xy$, G2$yx$ as Gxy, Gyx (x=r, s, t; y=u, v, w) according to expression (1):

$$Gxy=G1xy+G2xy,\ Gyx=G2yx+G2yx\ (x=r,\ s,\ t;\ y=u,\ v,\ w) \qquad (1)$$

The gate driver 25 in FIG. 1 controls turning on/off the 18 semiconductor switches 3 to 20 (Sxy, Syx) (x=r, s, t; y=u, v, w) by the gate signals (Gxy, Gyx) (x=r, s, t; y=u, v, w) (simply as G) of the 18 semiconductor switches from the gate signal combining section 24. When the gate signal is 1, the corresponding semiconductor switch is turned off; when the gate signal is 0, the corresponding semiconductor switch is turned off.

Figure 4:
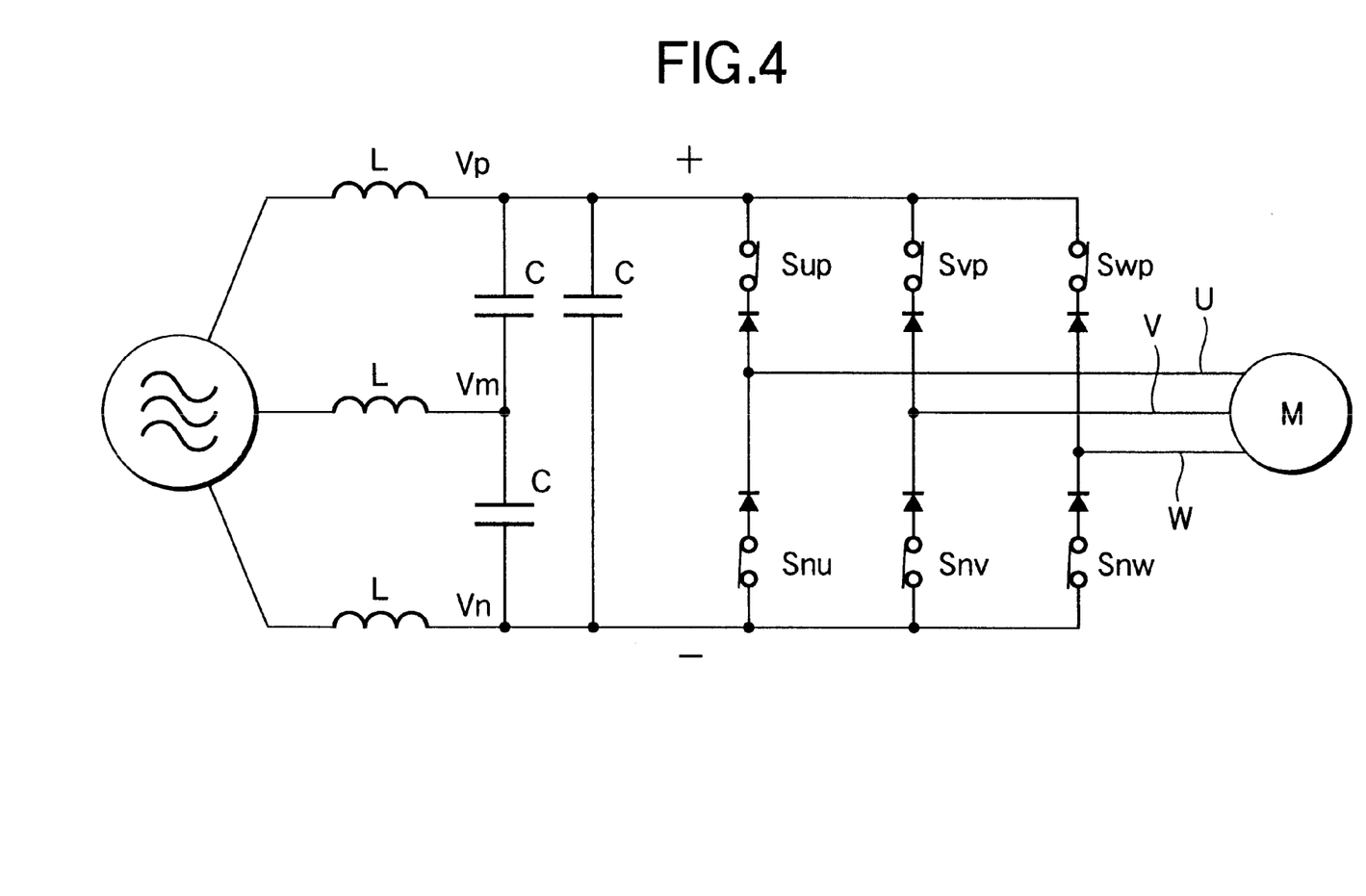
FIG. 4 is an equivalent circuit diagram of a regenerative mode when the three-phase/three-phase PWM cycloconverter of the invention is shut off.

According to the first embodiment described above, the uni-directional switches Sup, Svp, and Swp from the output phases to the input maximum voltage phase and the uni-directional switches Snu, Snv, and Snw from the input minimum voltage phase to the output phases are always turned on by G2, as shown in FIG. 4. In FIG. 4, Vp, Vm, and Vn denote the maximum voltage, intermediate voltage, and minimum voltage respectively in the three-phase input voltages.

In the normal operation, when Sup, Svp, Swp, Snu, Snv, and Snw are turned off by G1, if Sup, Svp, Swp, Snu, Snv, and Snw are turned on by G2, Sup, Svp, Swp, Snu, Snv, and Snw are reverse-biased and thus are not brought into conduction. That is, if Sup, Svp, Swp, Snu, Snv, and Snw are always turned on, the normal operation is not affected.

On the other hand, if Syp, Sny (y=u, v, w) is always turned on, if the load current direction is erroneously detected during commutating, when the PWM cycloconverter is controlled by G1 from the normal controller 23 and output becomes open, a surge voltage occurs in output y phase (y=u, v, w), but one of Syp and Sny is brought into conduction and thus the surge voltage is absorbed in the capacitor of the input side.

To shut off the PWM cycloconverter when an operation anomaly occurs, all G1 signals are set to 0 and only Sup, Svp, Swp, Snu, Snv, and Snw remain on by the G2 signals. At the time, the main circuit is equivalent to the circuit in FIG. 4. The circuit is closely analogous to the circuit when a DC-AC inverter is shut off. A surge voltage appears in each output phase and the current remaining in the stator of the motor continues to flow into the input side via three of Sup, Svp, Swp, Snu, Snv, and Snw and then becomes zero. After the load current becomes zero, all uni-directional switches are turned off and shutting off the PWM cycloconverter is terminated.

In the shut off process of the PWM cycloconverter described above, like the shut off process of DC-AC inverter, neither short-circuit mode nor open mode exists in the output side and thus the load current is not increased and a large surge voltage does not appear.

Figure 5:
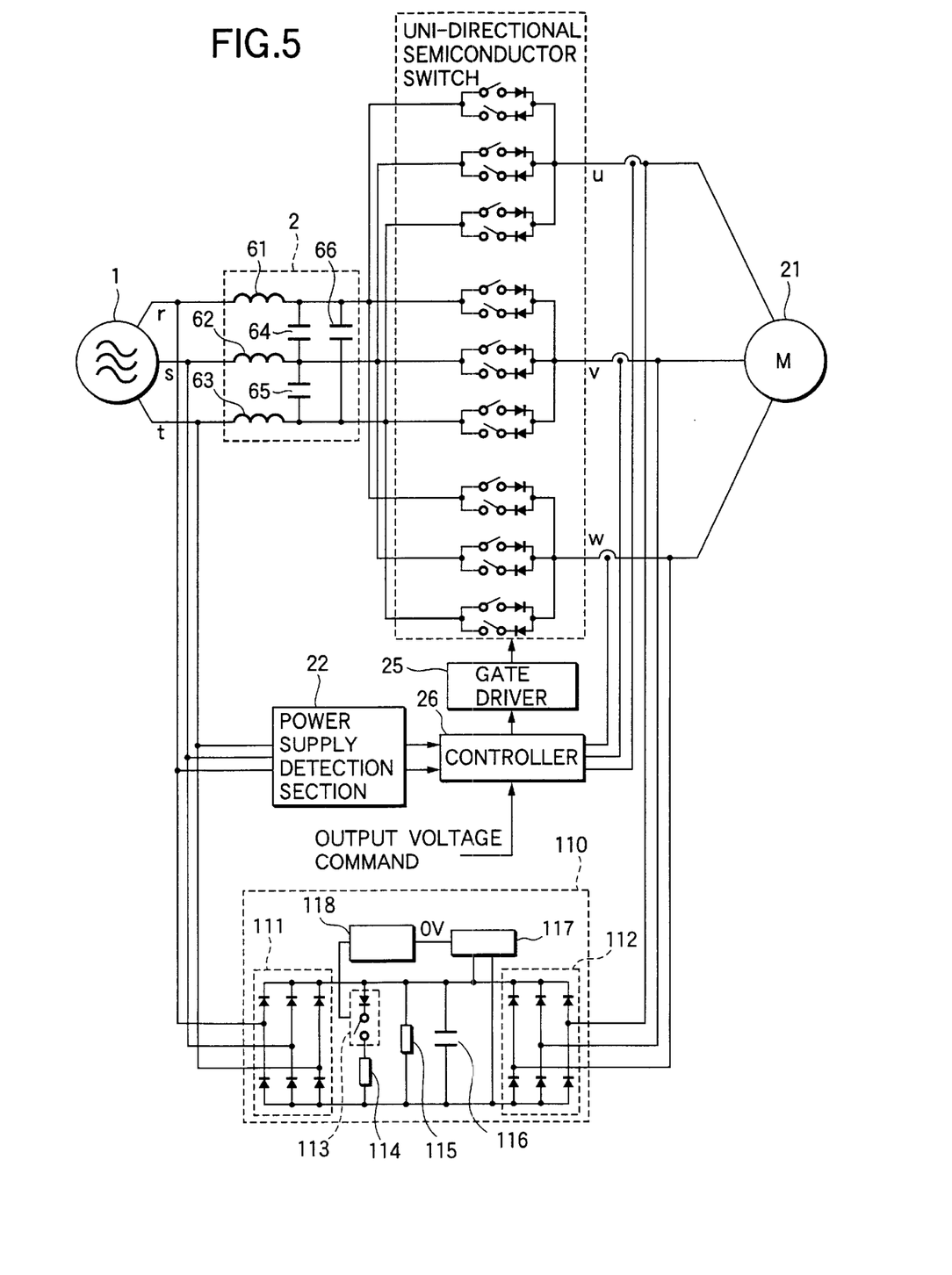
FIG. 5 is a block diagram of a three-phase/three-phase PWM cycloconverter of a second embodiment of the invention.

FIG. 5 is a block diagram to show the configuration of a PWM cycloconverter of a second embodiment of the invention (in the second embodiment, the number of phases M=3). Components similar to or identical with those in FIGS. 1 and 8 are denoted by the same reference numerals in FIG. 5 and will not be discussed again. In FIG. 5, numerals 1 to 22 and 25 are similar to those in FIG. 1 and numerals 110 to 118 are similar to those in FIG. 8.

In the normal operation, a controller 26 controls 18 uni-directional switches like the controller 23 in FIG. 1. An output surge voltage produced because of a commutation mistake is absorbed in a rectification snubber 110. When an operation anomaly occurs and the PWM cycloconverter is to be shut off, the controller 26 first allows uni-directional switches which are on in the same direction as the load current among uni-directional switches connected in the same output phase to remain on, and turns off other uni-directional switches. Input voltage information is estimated based on the phase of a power supply voltage output from a power supply voltage detection circuit in Δt after that time, Sup, Svp, Swp, and Snu, Snv, Snw are turned on. In Δt after the time, other uni-directional switches than Sup, Svp, Swp, Snu, Snv, Snw are turned off. The following process is similar to the shut off process in the first embodiment.

Since Sup, Svp, Swp, Snu, Snv, and Snw are turned on, it is necessary to commutate uni-directional switches when the input maximum voltage phase or the input minimum voltage phase changes until the load current becomes zero. In this case, first the uni-directional switch of the commutation destination is turned on and the uni-directional switch of the commutation source is turned off in Δt.

In the first and second embodiments described above, the output short circuit 120 in the related art need not be provided and when the PWM cycloconverter is shut off, the load current does not grow. In the first embodiment, the rectification snubber 110 is not required. However, if input voltage information is erroneous during the normal operation, there is a possibility that the input side may become short-circuited, and thus an input voltage information detection circuit with high accuracy is required.

In the second embodiment, if the input maximum voltage phase and the input minimum voltage phase are not erroneous, even if the input maximum voltage phase or the input minimum voltage phase and input intermediate voltage phase are erroneous, input short-circuit does not occur and thus the accuracy of the input voltage information may be low. Therefore, the input voltage information may be estimated, for example, based on the phase of the power supply voltage. Thus, in the second embodiment, the input voltage information detection section 30 need not be provided. Although the rectification snubber circuit 110 is required, the function of the rectification snubber may be only to absorb an output surge voltage produced because of a mistake of load current direction detection and thus the capacitance of a capacitor of the rectification snubber can be considerably lessened as compared with that in the related art.

In the first and second embodiments described above, when the PWM cycloconverter is shut off, Sxp and Snx are not turned on at the same time and when the load current of output x phase flows from output phase into input phase, only Sxp may be turned on and when the load current of output x phase flows from input phase into output phase, only Snx may be turned on (x=u, v, w).

In the first and second embodiments described above, when the PWM cycloconverter is shut off, energy remaining in the stator of the motor 21 (simply, remaining energy) is rapidly regenerated to the input side of the PWM cyclocon-verter via Sup, Svp, Swp, Snu, Snv, Snw. If the reactance of the reactor 61, 62, 63 of AC line filter 2 on the input side of the PWM cycloconverter is relatively larger than the capacitance of capacitor 64, 65, 66, the remaining energy in the motor 21 at the shut off time cannot rapidly be regenerated to three-phase AC power supply 1 and thus the voltage of the capacitor 64, 65, 66 is increased and the voltage of the capacitor of the rectification snubber is also increased together and there is a possibility that the semiconductor switches 3 to 20 may be destroyed. In this case, a large capacitor of rectification snubber must be used.

Figure 6:
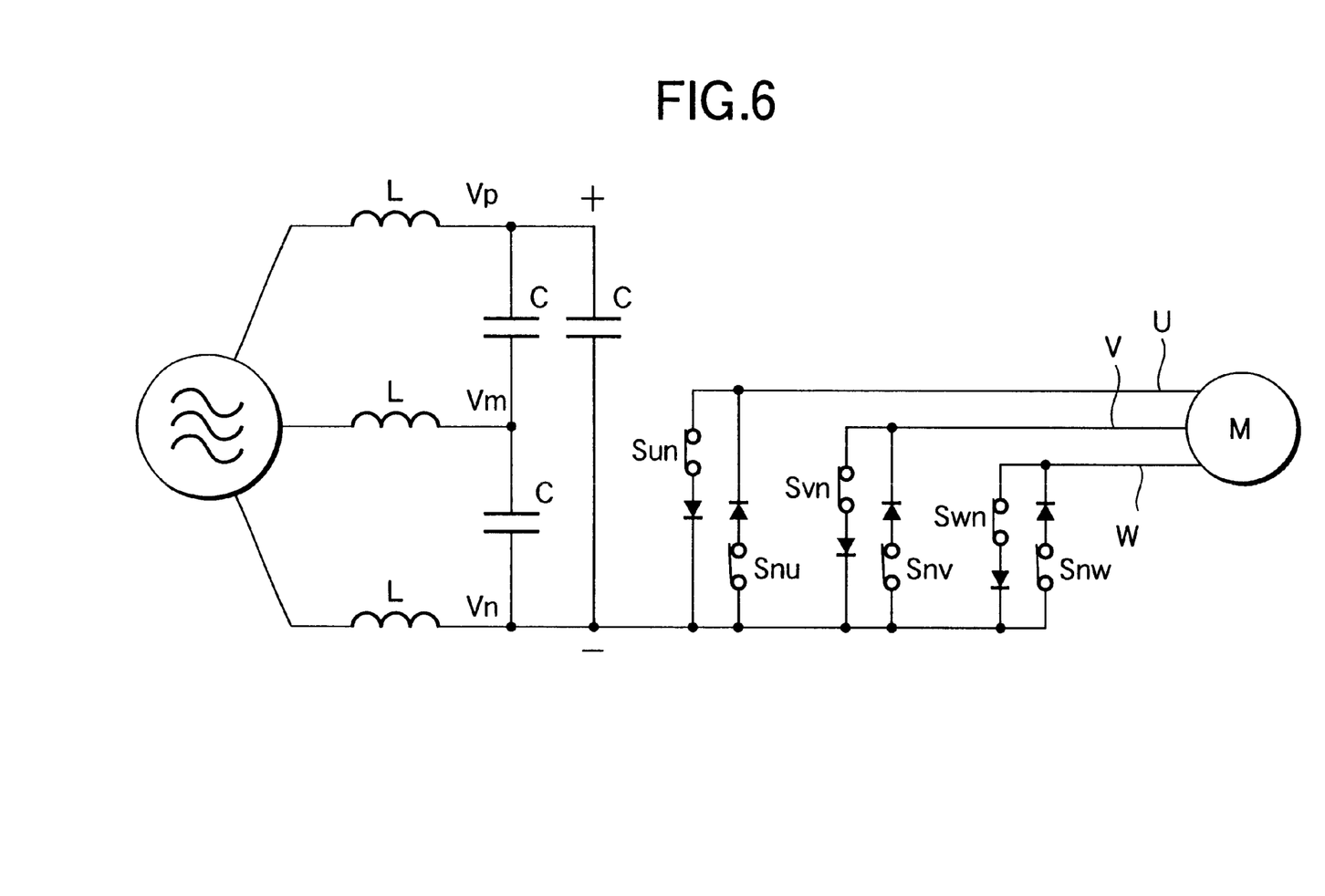
FIG. 6 is an equivalent circuit diagram of a short-circuit mode when the three-phase/three-phase PWM cycloconverter is shut off.

As a solution to this problem, a regenerative mode for turning on only Sup, Svp, Swp, Snu, Snv, and Snw at the shut off time and a short-circuit mode for turning on only uni-directional switches between the same phase of input and three phases of output are switched for use. FIG. 6 shows an equivalent circuit of the short-circuit mode. In the regenerative mode, electric power flows from the output side into the input side; in the short-circuit mode, electric power is not exchanged between the output side and the input side. That is, the remaining energy in the motor 21 is regenerated slowly to the three-phase AC power supply 1 intermittently via the AC line filter 2.

In the short-circuit mode shown in FIG. 6, only the uni-directional switch between an arbitrary input phase and three phases of output rather than the input minimum voltage phase may be turned on. In the short-circuit mode, only the uni-directional switch in the same direction as the load current of the output phase may be turned on without turning on all uni-directional switches between the same phase of input and three phases of output.

Figure 7:
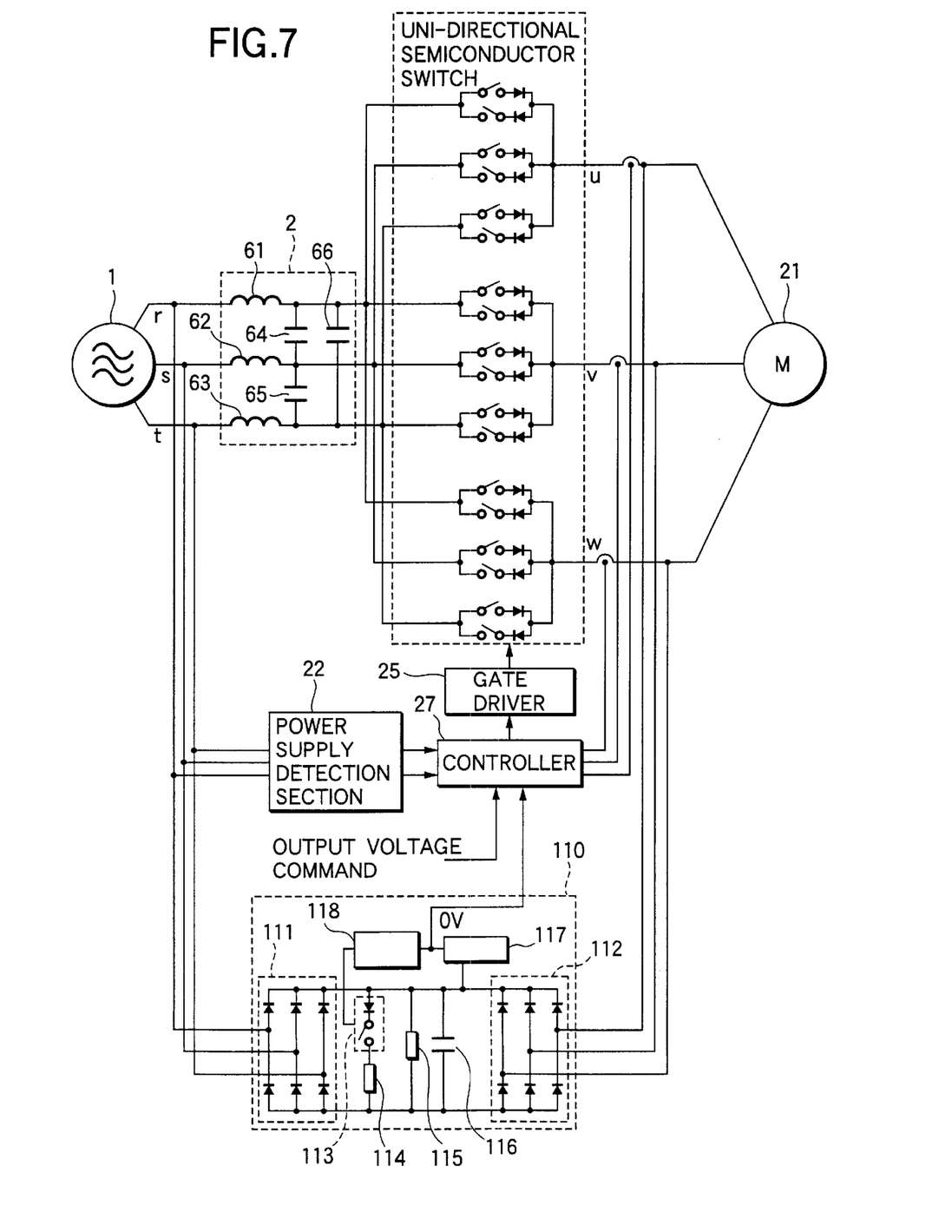
FIG. 7 is a block diagram of a three-phase/three-phase PWM cycloconverter of a third embodiment of the invention.

FIG. 7 is a block diagram to show the configuration of a PWM cycloconverter of a third embodiment of the invention (in the third embodiment, the number of phases M=3). The configuration of the third embodiment basically is the same as that of the second embodiment except that an output signal OV of a voltage detection circuit 117 of the third embodiment is input to a controller 27.

In the normal operation, the controller 27 controls 18 uni-directional switches like the controller 26 of the second embodiment. To shut off, as with the controller 26 of the second embodiment, first a regenerative mode for turning on only Sup, Svp, Swp, Snu, Snv, and Snw is entered and when the voltage of a capacitor 116 of a rectification snubber is raised to a reasonable extent or more, a short-circuit mode as shown in FIG. 7 is entered and when the voltage of the capacitor 116 falls below a reasonable extent, the mode is restored to the regenerative mode. The regenerative mode and the short-circuit mode are switched in such a manner and the remaining energy in a motor 21 is slowly regenerated to a three-phase AC power supply 1 intermittently. Various methods of switching the regenerative mode and the short-circuit mode at the shut off time are available; in the method of the third embodiment, the use of capacitors 64, 65, and 66 of an AC line filter 2 and the capacitor 116 of the rectification snubber is maximized, the current of a stator of the motor is not increased, and the shut off time is the shortest.

What is claimed is:

1. A protection apparatus of a PWM cycloconverter of a power converter wherein phases of a three-phase AC power supply and phases of the power converter for outputting M phases (where M is an integer of two or more) are directly connected by two-way semiconductor switches each consisting of a pair of one-way semiconductor switches for allowing an electric current to flow only in one way and being able to be turned on and off separately, said protection apparatus comprising:

fault detection means for detecting a fault of the above-mentioned PWM cycloconverter;

operation stop means for turning off at least some of the above-mentioned one-way semiconductor switches of the above-mentioned PWM cycloconverter if the above-mentioned fault signal occurs;

continuous flow means for allowing a load current of the above-mentioned PWM cycloconverter to continuously flow if at least some output phases of the above-mentioned PWM cycloconverter become open; and protection switching means for turning on and off the above-mentioned one-way semiconductor switches of the above-mentioned PWM cycloconverter based on the fault signal output from said fault detection means, thereby allowing the above-mentioned load current to continuously flow into the above-mentioned three-phase AC power supply via the above-mentioned PWM cycloconverter, characterized in that said protection switching means comprises input voltage information detection means for recognizing voltages of three terminals of input side of the above-mentioned two-way semiconductor switches as three-phase input voltages and detecting information based on which greater-than, equal-to, less than relation of the above-mentioned three-phase input voltages can be-determined as input voltage information; and regenerative switching means for turning on only the above-mentioned one-way semiconductor switch from each output phase to an input phase which becomes the maximum voltage of the above-mentioned three-phase input voltages or only the above-mentioned one-way semiconductor switch from an input phase which becomes the minimum voltage of the above-mentioned three-phase input voltages to each output phase based on the input voltage information.

2. The protection apparatus of the PWM cycloconverter as claimed in claim 1 wherein said protection switching means comprises the above-mentioned input voltage information detection means and the above-mentioned regenerative switching means;

short-circuit switching means for turning on at least some of the above-mentioned one-way semiconductor switches between one arbitrary phase of the above-mentioned three-phase AC power supply and each output phase; and switch means for switching the above-mentioned regenerative switching means and the above-mentioned short-circuit switching means for use.

3. The protection apparatus of the PWM cycloconverter as claimed in claim 1 comprising:

input voltage information detection means for recognizing voltages of three terminals of input side of the above-mentioned two-way semiconductor switches as three-phase input voltages and detecting information based on which greater-than, equal-to, less than relation of the above-mentioned three-phase input voltages can be determined as input voltage information; and gate drive means for always turning on the above-mentioned one-way semiconductor switch from each output phase to an input phase which becomes the maximum voltage of the above-mentioned three-phase input voltages and the above-mentioned one-way semiconductor switch from an input phase which becomes the minimum voltage of the above-mentioned three-phase input voltages to each output phase based on the input voltage information while the above-mentioned PWM cycloconverter is operating or is shut off.

4. A protection method of a PWM cycloconverter of a power converter wherein phases of a three-phase AC power supply and phases of the power converter for outputting M phases (where M is an integer of two or more) are directly connected by two-way semiconductor switches each consisting of a pair of one-way semiconductor switches for allowing an electric current to flow only in one way and being able to be turned on and off separately, said protection method comprising the steps of:

detecting a fault of the above-mentioned PWM cycloconverter;

turning off at least some of the above-mentioned one-way semiconductor switches of the above-mentioned PWM cycloconverter if the above-mentioned fault signal occurs;

allowing a load current of the above-mentioned PWM cycloconverter to continuously flow if at least some output phases of the above-mentioned PWM cycloconverter become open; turning on and off the above-mentioned one-way semiconductor switches of the above-mentioned PWM cycloconverter based on the fault signal output from said fault detection means, thereby allowing the above-mentioned load current to continuously flow into the above-mentioned three-phase AC power supply via the above-mentioned PWM cycloconverter;

recognizing voltages of three terminals of input side of the above-mentioned two-way semiconductor switches as three-phase input voltages and detecting information based on which greater-than, equal-to, less than relation of the above-mentioned three-phase input voltages can be determined as input voltage information; and turning on only the above-mentioned one-way semiconductor switch from each output phase to an input phase which becomes the maximum voltage of the above-mentioned three-phase input voltages or only the above-mentioned one-way semiconductor switch from an input phase which becomes the minimum voltage of the above-mentioned three-phase input voltages to each output phase based on the input voltage information.

5. The protection method of the PWM cycloconverter as claimed in claim 4 wherein regenerative switching means for turning on only the above-mentioned one-way semiconductor switch from each output phase to an input phase which becomes the maximum voltage of the above-mentioned three-phase input voltages or only the above-mentioned one-way semiconductor switch from an input phase which becomes the minimum voltage of the above-mentioned three-phase input voltages to each output phase based on the input voltage information and short-circuit switching means for turning on at least some of the above-mentioned one-way semiconductor switches between one arbitrary phase of the above-mentioned three-phase AC power supply and each output phase are switched.

6. The protection method of the PWM cycloconverter as claimed in claim 4 wherein voltages of three terminals of input side of the above-mentioned two-way semiconductor switches are recognized as three-phase input voltages and information based on which greater-than, equal-to, less than relation of the above-mentioned three-phase input voltages can be determined is detected as input voltage information and wherein the above-mentioned one-way semiconductor switch from each output phase to an input phase which becomes the maximum voltage of the above-mentioned three-phase input voltages and the above-mentioned one-way semiconductor switch from an input phase which becomes the minimum voltage of the above-mentioned three-phase input voltages to each output phase are always turned on based on the input voltage information while the above-mentioned PWM cycloconverter is operating or is shut off.

* * * * *